United States Patent [19]

Kirkwood

[11] 4,170,568

[45] Oct. 9, 1979

[54] POLYMERIZATION CATALYST

[75] Inventor: Kenneth C. Kirkwood, Larbert, Scotland

[73] Assignee: BP Chemicals Limited, London, United Kingdom

[21] Appl. No.: 883,639

[22] Filed: Mar. 6, 1978

Related U.S. Application Data

[63] Continuation-in-part of Ser. No. 772,681, Feb. 28, 1977, abandoned.

[30] Foreign Application Priority Data

Mar. 1, 1976 [GB] United Kingdom ................ 8031/76

[51] Int. Cl.$^2$ ............................. C08F 4/02; C08F 4/10
[52] U.S. Cl. ................................. 252/430; 252/429 B; 252/429 C; 252/431 R; 252/431 C; 526/124
[58] Field of Search ........... 252/429 R, 429 C, 431 C, 252/441, 429 B, 431 R, 430

[56] References Cited

U.S. PATENT DOCUMENTS

| | | | |
|---|---|---|---|
| 3,663,660 | 5/1972 | Delbouille et al. | .......... 252/429 C X |
| 3,676,415 | 7/1972 | Diedrich et al. | ............ 252/429 C X |

FOREIGN PATENT DOCUMENTS 1372628 11/1974 United Kingdom .
1402738 8/1975 United Kingdom .

*Primary Examiner*—Patrick Garvin
*Attorney, Agent, or Firm*—Brooks, Haidt, Haffner & Delahunty

[57] ABSTRACT

A process for making a supported Ziegler catalyst by (i) forming a support material by heating a magnesium carboxylate to convert it at least partially to magnesium oxide and (ii) impregnating said support material with product of reacting a halo-transition metal compound with an alcohol. The transition metal is Ti, V or Zr and the halo-compound is a halide, haloalkoxide, or oxyhalide. The catalyst can be activated using conventional Ziegler catalyst activations, e.g. triethyl aluminium.

12 Claims, No Drawings

POLYMERIZATION CATALYST

This application is a continuation-in-part of applicant's earlier application Ser. No. 772,681 filed Feb. 28, 1977, now abandoned.

The present invention relates to a process for the production of a supported Ziegler catalyst and to the use of the catalyst in the polymerisation of olefins.

It has long been known that olefins such as ethylene can be polymerised by contacting them under polymerisation conditions with a catalyst comprising a transition metal compound, e.g. titanium tetrachloride and a co-catalyst or activator, e.g. an organometallic compound such as triethyl aluminium Catalysts of this type are generally referred to as Ziegler catalysts and will be so referred to throughout this specification. The catalyst and co-catalyst together will be referred to as activated Ziegler catalysts. It is also known to deposit such catalysts on support materials such as silicon carbide, calcium phosphate, magnesium or sodium carbonate.

UK patent specification No. 1,402,738 discloses supporting a halogen-containing transition metal compound on the product of heating inter alia a magnesium salt of an organic acid anhydrous or containing water of crystallisation, wherein the said heating is at a temperature below the decomposition temperature of the salt. The formed supported Ziegler catalyst is activated with a conventional activator and used to polymerise ethylene in a conventional manner. Example 7 of UK 1,402,738 discloses, by way of comparison, heating magnesium oxalate dihydrate to above its decomposition point and treating the product with titanium tetrachloride. The resulting catalyst was activated with triethyl aluminium and used to polymerise ethylene. The catalyst had very low activity.

The present invention provides a process for the production of a supported Ziegler catalyst comprising (I) forming a support material by heating the magnesium salt of an organic carboxylic acid under conditions so that at least part thereof is converted to magnesium oxide, and (II) impregnating the said support material with the product of reacting together (a) a transition metal compound which is a halide, haloalkoxide or oxyhalide of titanium, vanadium or zirconium and (b) an aliphatic alcohol.

The magnesium salt employed in the process of the present invention can be the salt of a mono- or polycarboxylic acid, for example, magnesium formate, magnesium acetate, magnesium oxalate, magnesium malonate or magnesium maleate, or organic acids such as magnesium benzoate. The salt can be anhydrous, hydrated or solvated.

The heating of the magnesium salt must be carried out under conditions such that at least part, for example 5%, preferably at least 50 wt %, most preferably at least 60% is converted to magnesium oxide. The degree of conversion to magnesium oxide can be determined satisfactorily by elementary analysis or by x-ray diffraction. The temperature at which a magnesium salt of an organic carboxylic acid commences to decompose to magnesium oxide will, of course, depend on the given salt, and may be for instance in the range 300° to 700° C. The decomposition temperature for any particular salt may be determined by trial and error. The heating is preferably carried out at a temperature only marginally above the decomposition temperature of the salt, for example between 5° and 100° C. above the decomposition temperature. The heating can be carried out, for example, 'in vacuo', in an inert gas such as steam or nitrogen or in air. It is preferred to carry out the heating in air. If desired, a stream of gas, e.g. steam or nitrogen, can be used to fluidise the powdered salt during the heating.

The product of heating the magnesium salt of the carboxylic acid if preferably sieved or screened before the impregnation (step II). If the product of the heating contains lumps it can, for example, be sieved to separate the product having the desired particle size and the lumps may be ground and sieved again. Preferably the product used as the support material has a particle size in the range 1 $\mu$m to 500 $\mu$m (mean particle diameter) and most preferably in the range 50 $\mu$m to 250 $\mu$m.

The transition metal compound employed in the present invention is a halide, haloalkoxide or oxyhalide of titanium, vanadium or zirconium. Preferably the halogen is chlorine. Compounds having the general formula $M(OR)_n Cl_{m-n}$ are particularly preferred wherein M is Ti, V or Zr, $0 \leq n < m$, m is the valency of M and is 4 when M is Ti or Zr and is 3, 4 or 5 when M is V. R is alkyl preferably containing 1-12, most preferably 1-6 carbon atoms, for example, ethyl, propyl, butyl or phenylethyl. Examples of transition metal compounds are titanium tetrachloride, zirconium tetrachloride, vanadium trichloride, ethoxy titanium trichloride i.e. Ti(OC$_2$H$_5$)Cl$_3$, di-isopropoxytitanium dichloride i.e. Ti(OiPr)$_2$Cl$_2$, vanadyl chloride ie VOCl$_3$, or mixtures thereof. Preferably the transition metal compound is a titanium compound. Titanium tetrachloride is particularly preferred.

The quantity of transition metal compound employed is suitably sufficient to give a concentration of the metal in the catalyst in the range 0.5 to 15 wt %, preferably 1.5 to 9 wt % based on the total weight of catalyst. If desired, an excess, for example up to 100 times the concentration in the final catalyst, of transition metal compound may be employed provided that the final catalyst contains 0.5 to 15 wt % of transition metal.

The aliphatic alcohol employed in the present invention is suitably a straight or branched chain alcohol containing up to 12 carbon atoms for example methanol, ethanol, isopropanol, isobutanol, 2-ethyl hexanol and phenylethanol. Preferably the alcohol contains 1-6 carbon atoms. Isopropanol is particularly preferred.

The quantity of alcohol employed is suitably 0.1 to 4.0 moles, preferably 1.0 to 3.5, most preferably 2.25 to 3.0 moles per mole of transition metal compound.

The transition metal compound must react with the aliphatic alcohol under the reaction conditions employed. Hydrogen halide is formed during the reaction and this may be evolved as gaseous hydrogen halide, or remain in solution if the reaction is carried out in solvent or with excess alcohol, or the hydrogen halide may form a complex with the reaction product.

The reaction between the transition metal compound and the aliphatic alcohol is preferably carried out in the presence of an inert solvent, examples of suitable solvents being hexane, cyclohexane, isobutane, isopentane, toluene and mixed aliphatic and aromatic hydrocarbon solvents. The reaction can be carried out at any desired temperature. Normally temperatures in the range 0°–150° C. are found to be satisfactory.

The impregnation of the support material can be carried out by any convenient technique for example by reacting the transition metal compound with the aliphatic alcohol in the presence of the support material.

Alternatively the transition metal compound and the aliphatic alcohol can be reacted together and the reaction product then added to the support material.

The impregnation of the support material is preferably carried out at a temperature in the range 0° to 240° C., most preferably in the range 40° to 140° C. The impregnation can be carried out in the presence of an inert diluent or a solvent for the reaction product of the transition metal compound and the alcohol. Suitable inert diluents (which in some cases are also solvents for the said reaction product) are, for example, saturated aliphatic hydrocarbons such as petroleum ether, butane, pentane, hexane, heptane, methyl cyclohexane and aromatic hydrocarbons such as benzene, toluene and xylene. When an inert diluent or solvent is employed it is often convenient to carry out the impregnation of the magnesium-containing support material at the reflux temperature of the solvent.

Any excess transition metal compound remaining in the catalyst after the impregnation (i.e. transition metal compound that has not reacted with or not been absorbed by the support material) is preferably removed from the catalyst, for example by solvent washing, filtration, centrifuging or other convenient techniques which do not have a deleterious effect on the catalyst.

The reaction between the transition metal compound and the alcohol and the impregnation step are preferably carried out in the absence of moisture.

The present invention further provides a process for polymerising 1-olefins comprising contacting the monomer under polymerisation conditions with the supported Ziegler catalyst of the present invention in the presence of a Ziegler catalyst activator.

The polymerisation process according to the present invention can be applied to the polymerisation of 1-olefins e.g. ethylene or propylene or mixtures of olefins, e.g. ethylene with other 1-olefins, for example, propylene, 1-butene, 1-pentene, 1-hexene, 4-methyl pentene-1, 1-3-butadiene or isoprene. The process is particularly suitable for the polymerisation of ethylene or copolymerisation of ethylene with up to 40 weight % (based on total monomer) of comonomers i.e. one or more other 1-olefins.

Ziegler catalyst activators and the methods by which they are used to activate Ziegler catalysts are well-known. Examples of Ziegler catalyst activators are organic derivatives or hydrides of metals of Groups I, II, III and IV of the Periodic Table. Particularly preferred are the trialkyl aluminiums, e.g. triethyl or tributyl aluminium, or alkyl aluminium halides.

The polymerisation conditions can be in accordance with known techniques used in supported Ziegler polymerisation. The polymerisation can be carried out in the gaseous phase or in the presence of a dispersion medium in which the monomer is soluble. As a liquid dispersion medium use can be made of an inert hydrocarbon which is liquid under the polymerisation conditions, or of the monomer or monomers themselves maintained in the liquid state under their saturation pressure. The polymerisation can, if desired, be carried out in the presence of hydrogen gas or other chain transfer agent to vary the molecular weight of the produced polymer.

The polymerisation is preferably carried out under conditions wherein the activated supported Ziegler catalyst is suspended in a liquid diluent so that the polymer is formed as solid particles suspended in the liquid diluent. Suitable diluents are, for example, selected from paraffins and cycloparaffins having from 3–30 carbon atoms per molecule. Examples of diluents include isopentane, isobutane, and cyclohexane. Isobutane is preferred.

The polymerisation can be carried out under continuous or batch conditions.

Method of recovering the product polyolefin are well-known in the art.

The polymerisation catalyst of the present invention can be used to make high density ethylene polymers and copolymers at high productivity having properties which render them suitable for injection moulding.

The invention is illustrated by the following examples;

In the Examples the melt index ($MI_{2.16}$) and high load melt index ($MI_{21.6}$) were determined according to ASTM method 1238 using 2.16 kg and 21.6 kg loads respectively; the units are grammes per 10 minutes. "MIR" is the melt index ratio $MI_{21.6}/MI_{2.16}$.

EXAMPLE 1A 80 g of dried magnesium acetate (BDH Laboratory Reagent) were placed in an oven at 200° C. The oven was rapidly heated to 375° C. and maintained at that temperature for 20 hours. The oven was purged with nitrogen for the first six hours. 21.3 g of a rough pale grey powder were obtained. The powder was ground with a mortar and pestle. Before use, 10 g of the support were placed in an oven at 150° C. under vacuum for 2 hours to ensure dryness. No further weight loss was observed.

57 ml of isopropanol and 150 ml of cyclohexane were stirred under an atmosphere of dry nitrogen and 36.4 ml of $TiCl_4$ were slowly added. The resultant yellow solution was refluxed for 2 hours. The solution was allowed to cool to 55° C. and 10 g of the support, prepared as described above, were added. The mixture was refluxed for 3 hours and the catalyst slurry washed seven times with cyclohexane to ensure that the concentration of titanium in the solvent was less than 1g/l. The volume was made up to 500 ml with dry cyclohexane and the catalyst handled as a slurry with a solids content of 51 mg/ml. Analysis of the catalyst yielded (w/w) - Ti 4.77%, Cl 34.26%.

EXAMPLE 1B 70 g of dried magnesium acetate (BDH Laboratory Reagent) were placed in an oven at 200° C. The temperature was quickly raised to 600° C. No gas purge was employed. This temperature was maintained for 16 hours and 18.7g of a rough grey powder (similar to that formed in the first example) were obtained. This was ground in a mortar and pestle and a catalyst prepared as in Example 1A. The solids content of this catalyst was 60.5 mg/ml. Analysis of the catalyst yielded (w/w) - Ti 5.60%, Cl - 25.90%.

EXAMPLE 2

80 g of hydrated magnesium oxalate, $MgC_2O_4.2H_2O$ (BDH Laboratory Reagent) were placed in an oven at 125° C. The oven was rapidly heated to 600° C. and maintained at that temperature for 17 hours. The oven was purged with nitrogen for the first six hours to prevent a dangerous build-up of carbon monoxide. The weight of the resultant fine white powder was 20.5 g. The support was predried and the catalyst prepared as described in Example 1A. Six washes were required to remove free Ti salts. The solids content of the catalyst slurry was 79 mg/ml. Analysis of the catalyst yielded Ti 4.86%, Cl 33.64%.

POLYMERISATION

Polymerisations were carried out using the catalysts of Example 1 and 2 in a 2.3 l stainless steel stirred autoclave. The reactor was purged with nitrogen, heated to 70° C. and then 2 ml of the catalyst slurry added with a syringe. This was followed by the triethyl aluminium co-catalyst in 1 liter of isobutane. The temperature was raised to 80° C. The required pressure of hydrogen was added, followed by ethylene to bring the total pressure of the reactor contents to 41.4 bar. Ethylene was added continuously to maintain this pressure during the reaction. Polymerisation and polymer property data are shown in the Table.

TABLE

| Catalyst Prep. | Catalyst Wt. (mg) | Co-Catalyst Wt. (mg) | $H_2$ Partial Pressure (bar) | Productivity (g/g hour) | $MI_{2.16}$ (g/10 min) | MIR | Polymer Size (%) >500μm (w/w) | Polymer Size (%) <100μm (w/w) |
| --- | --- | --- | --- | --- | --- | --- | --- | --- |
| Ex. 1A | 102 | 251 | 5.2 | 5602 | 5.52 | 25.8 | 10.8 | 1.3 |
| " | 102 | 251 | 7.6 | 4156 | 18.48 | 23.9 | 17.4 | 3.2 |
| Ex. 1B | 121 | 251 | 5.2 | 3813 | 3.54 | 31.8 | 48.1 | 0.1 |
| " | 121 | 251 | 6.9 | 2975 | 4.38 | 28.2 | 51.9 | Nil |
| Ex. 2 | 158 | 251 | 5.2 | 1981 | 3.24 | 26.5 | 96.0 | Nil |
| " | 158 | 251 | 6.9 | 1373 | 9.60 | 26.7 | 91.6 | Nil |

I claim:

1. a process for the production of a supported Ziegler catalyst A (I) forming a support material by heating the magnesium salt of an organic carboxylic acid under conditions so that at least part thereof is converted to magnesium oxide, and (II) impregnating the said support material with the crude product of reacting together (a) a transition metal compound which is a halide, haloalkoxide or oxyhalide of titanium, vanadium or zirconium and (b) an aliphatic alcohol.

2. A process as claimed in claim 1 wherein the magnesium salt is magnesium formate, magnesium acetate, magnesium oxalate, magnesium malonate, magnesium maleate or magnesium benzoate.

3. A process as claimed in claim 1 wherein at least 60% of the magnesium salt is converted to magnesium oxide.

4. A process as claimed in claim 1 wherein the heating is carried out at a temperature between 5° and 100° above the decomposition temperature of the salt.

5. A process as claimed in claim 1 wherein the transition metal compound is a compound having the general formula $M(OR)_nCl_{m-n}$ wherein M is Ti, V or Zr; $zero \leq n < m$; m is the valency of M; m=4 when M is Ti or Zr, or m=3, 4 or 5 when M is V; R is an alkyl group containing 1-12 carbon atoms.

6. A process as claimed in claim 5 wherein M is Ti.

7. A process as claimed in claim 1 wherein the transition metal compound is titanium tetrachloride.

8. A process as claimed in claim 1 wherein the quantity of transition metal compound employed is sufficient to give a concentration of transition metal in the catalyst in the range 1.5 to 9 wt % based on the total weight of catalyst.

9. A process as claimed in claim 1 wherein the alcohol contains 1-6 carbon atoms.

10. A process as claimed in claim 1 wherein the transition metal compound is titanium tetrachloride and the alcohol is isopropanol.

11. A process as claimed in claim 10 wherein the titanium tetrachloride and the isopropanol are reacted in the presence of a diluent.

12. A supported Ziegler catalyst prepared according to claim 1 which has been activated by the addition thereto of an activating quantity of a trialkyl aluminium compound.

* * * * *

UNITED STATES PATENT AND TRADEMARK OFFICE
CERTIFICATE OF CORRECTION

PATENT NO. : 4,170,568
DATED : October 9, 1979
INVENTOR(S) : KENNETH C. KIRKWOOD It is certified that error appears in the above-identified patent and that said Letters Patent are hereby corrected as shown below:

Claim 1, second line, delete "A" after "catalyst".

Signed and Sealed this

Fifteenth Day of July 1980

[SEAL]

Attest:

SIDNEY A. DIAMOND

Attesting Officer

Commissioner of Patents and Trademarks